2,786,838
Patented Mar. 26, 1957

2,786,838

THIAMORPHOLINEDIONES AND PREPARATION THEREOF

Glenn S. Skinner, Newark, Del., and John B. Bicking, Hatfield, Pa., assignors, by mesne assignments, to Merck & Co., Inc., Rahway, N. J., a corporation of New Jersey No Drawing. Application May 19, 1954, Serial No. 430,976

11 Claims. (Cl. 260—243)

This invention is concerned with new derivatives of thiamorpholinedione and with a novel process for preparing these compounds. It is particularly concerned with 3,5-thiamorpholinediones wherein each of the hydrogens attached to the 2-position carbon atom has been replaced by a substituent group. The novel compounds of this invention can be illustrated by the following structural formula:

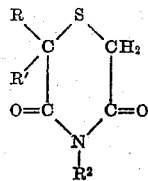

wherein R is a lower alkyl radical, either straight (i. e. continuous) or branched chain, such as methyl, propyl, amyl, isoamyl, heptyl, and the like; R' is a lower alkyl radical, either straight or branched chain, such as those illustrated above for R, an aryl radical, either unsubstituted or substituted by one or more halogen, alkoxy or alkyl radicals; $R^2$ is hydrogen or a lower alkyl or lower alkenyl radical, either straight or branched chain, such as a methyl, propyl, allyl, isobutyl, amyl and the like, an aralkyl, for example, a benzyl, cinnamyl and the like radicals, an acyl, derived from an aliphatic or an aromatic carboxylic acid, such as an acetyl, propionyl, benzoyl and the like.

The novel compounds of this invention are useful chemo-therapeutic agents. They are particularly useful as hypnotic agents, and some of them have marked anticonvulsant properties. The therapeutic properties of the novel compounds of this invention are associated with relatively low toxicity, thus providing a high therapeutic index, which renders the compounds not only effective but safe and reliable for use as hypnotic and anticonvulsant agents. Especially marked activity has been observed in the compounds illustrated by the structure above wherein R is an alkyl radical and R' is an alkyl or an aryl radical and $R^2$ is hydrogen or an alkyl radical. Among compounds of these types, those having particularly high activity both as hypnotic agents and as anticonvulsant agents are 2,2-diethyl-3,5-thiamorpholinedione, 2,2-diethyl-4-methyl-3,5-thiamorpholinedione, 2-ethyl-2-butyl-3,5-thiamorpholinedione, and 2-ethyl-2-phenyl-3,5-thiamorpholinedione.

The compounds of this invention are active when administered either intraperitoneally or per os. As most of the compounds are insoluble in water and as they hydrolyze at a fairly rapid rate in alkaline solution, they are advantageously suspended in colloidal solutions or gels or similar vehicles, such as carboxymethyl-cellulose and the like, or are tableted or packaged in conventional dry dosage forms, for example, in the form of capsules, pills, or tablets.

The compounds of this invention are most advantageously prepared by one of two methods. By one method, A, the compounds are prepared by starting with an α,α-disubstituted-α-bromoacetyl bromide and reacting it with ethanol to form the corresponding ethyl α,α-dialkyl-α-bromoacetate which, in turn, is reacted with the sodium or potassium salt of ethyl thioglycolate. The diethyl ester of the α,α-dialkylthiodiacetic acid thus obtained is hydrolyzed to the free acid, which then is reacted with ammonium hydroxide or with an amine and the resulting salt then is pyrolyzed to the corresponding 2,2-disubstituted-3,5-thiamorpholinedione or 2,2,4-trisubstituted-3,5-thiamorpholinedione respectively.

The second and perhaps better method for preparing the compounds of this invention, Method B, is to react an α,α-disubstituted-α-bromoacetyl bromide with thiourea to form a 5,5-disubstituted-2-imino-4-thiazolidone, which is then hydrolyzed to give a mixture of an α,α-disubstituted-α-mercaptoacetic acid and the corresponding α,α-disubstituted-α-mercaptoacetamide. This mixture of mercapto compounds is then reacted with (1) a haloacetic acid to form the corresponding thiodiacetic acid and the monoamide of the thiodiacetic acid or the mixture can be reacted with (2) a haloacetamide to form the corresponding thiodiacetamide and its monoamide. The mixture of mercapto compounds can also be reacted with (3) an alkyl ester of a haloacetic acid thus forming the monoalkyl ester of the α,α-disubstituted-thiodiacetic acid as well as the alkyl ester of its monoamide. The diacetic acid and the monoamide resulting from the reaction with haloacetic acid can be separated readily by fractional crystallization because the monoamide is the higher melting and the less soluble product of the two. The monoamide and the diamide resulting from the reaction with haloacetamide can be separated, if desired, by treatment with an alkaline solution in which the diamide is insoluble. Likewise, the alkyl ester of the α,α-disubstituted-thiodiacetic acid and the alkyl ester of its monoamide resulting from the reaction with an alkyl haloacetate can be separated, if desired, by treatment with an alkaline solution in which the amide is insoluble. Treatment of the diacetic acid with ammonium hydroxide or an amine followed by pyrolysis of the salt yields the desired 2,2-disubstituted-3,5-thiamorpholinedione or the 2,2,4-trisubstituted-3,5-thiamorpholinedione. The monoamide from either reaction 1 or 2 and the diamide resulting from the reaction with chloroacetamide can be converted to the desired 2,2-disubstituted-3,5-thiamorpholinedione by pyrolysis. The end products of the reaction with chloroacetamide need not be separated, as pyrolysis of the mixture of monoamide and diamide will form the 2,2-disubstituted-3,5-thiamorpholinedione directly. The alkyl ester of the α,α-disubstituted-thiodiacetic acid monoamide when heated with a strong mineral acid, e. g. hydrochloric acid, yields the 2,2-disubstituted-3,5-thiamorpholinedione directly. The alkyl ester of the α,α-disubstituted-thiodiacetic acid can be converted to its monoamide by treatment with thionyl chloride and then ammonia. This monoamide can be converted to the 2,2-disubstituted-3,5-thiamorpholinedione by the treatment described above. Or, the alkyl ester of the α,α-disubstituted-thiodiacetic acid monoamide can be hydrolyzed by treatment with acidic or basic aqueous solutions to the α,α-disubstituted-thiodiacetic acid which can be converted to the 2,2-disubstituted- or 2,2,4-trisubstituted-3,5-thiamorpholinediones by the process described above for the conversion of the diacetic acids. Alternately, the alkyl ester of the α,α-disubstituted-thiodiacetic acid monoamide can be hydrolyzed in acidic or basic aqueous solutions to give the monoamide of the α,α-disubstituted-thiodiacetic acid which can be converted to the 2,2-disubstituted-3,5-thiamorpholinedione by pyrolysis.

METHOD A

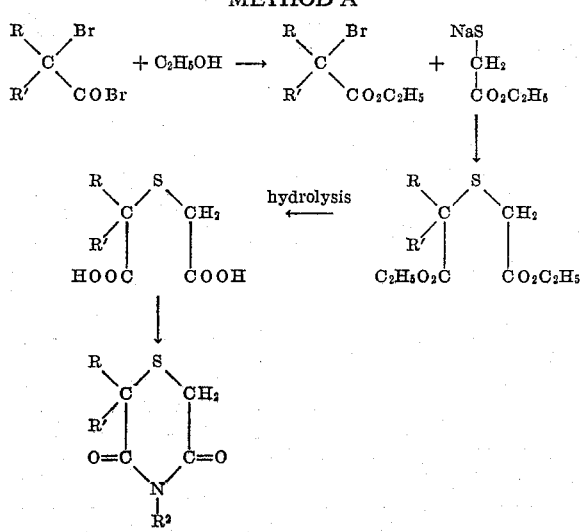

METHOD B

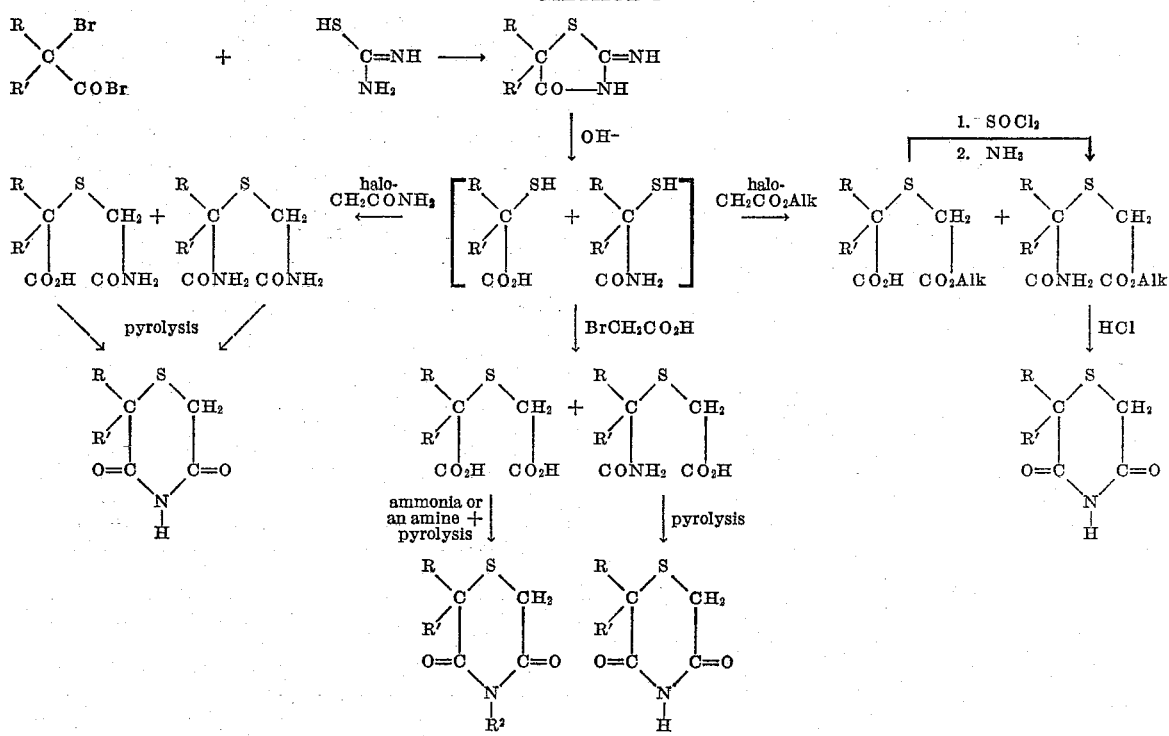

The starting material in each of the above processes is an α,α-disubstituted-α-bromoacetyl bromide. The preparation of these compounds is well known, and substantially all of the compounds employed as starting materials for making the compounds of this invention have previously been described in the literature. In general, they are prepared by reacting an α,α-disubstituted acetic acid with thionyl chloride to form the corresponding α,α-disubstituted-acetyl chloride, which is then brominated to form α,α-disubstituted-α-bromoacetyl bromide.

While the procedural steps described in method A are for the most part those commonly employed in making similar compounds, most of the procedural steps of method B are new and represent another novel feature of this invention.

The first step in method B, the conversion of the α,α-disubstituted-α-bromoacetyl bromide to the 5,5-disubstituted-2-imino-4-thiazolidone by reaction with thiourea, is a known reaction; however, the subsequent steps in method B are new and provide a means whereby the ultimate thiamorpholinediones of this invention can be obtained in relatively high yield.

It has been found that, by hydrolyzing a 5,5-disubstituted-2-imino-4-thiazolidone in the presence of dilute sodium hydroxide or potassium hydroxide with heating, preferably under refluxing conditions, for from about 6 hours to 6 days, a very good yield of a mixture of α,α-disubstituted-α-mercaptoacetic acid and its amide is obtained. The duration of refluxing is determined upon the degree of conversion to the acid desired. Good results are most consistently obtained by refluxing the thiazolidone solution for about 1–2 days. The mercapto products obtained as a result of this hydrolysis are usually in the form of an oil. The oil need not be further purified, as it can be dissolved in an alkaline solution such as a dilute sodium or potassium hydroxide solution or a sodium or potassium carbonate solution and the like and then either treated with an equivalent quantity of bromoacetic acid or chloroacetic acid in an alkaline solution such as a dilute sodium or potassium hydroxide solution or a sodium or potassium carbonate solution to form the α,α-disubstituted-thiodiacetic acid and the corresponding monoamide, or with chloroacetamide or bromoacetamide to form α,α-disubstituted-thiodiacetamide and its corresponding monoamide. Reaction occurs readily in either case upon the addition of the bromoacetic acid or the chloroacetamide solution to the solution of the mercapto products. The alkaline solution employed can advantageously be a dilute solution having a concentration of about 10%, although a higher or lower concentration will not materially affect the reaction. The reaction forming the sulfide linkage is generally quite rapid.

Acidification of the reaction mixture following the reaction with bromoacetic acid causes an oily material to precipitate consisting of two compounds which can be separated readily by virtue of their greatly differing solubilities in organic solvents. Acidification is preferably accomplished by use of a mineral acid, although an organic acid, such as acetic acid, could also be employed. The more soluble compound is α,α-disubstituted-thiodiacetic acid, and the less soluble compound is the monoamide of α,α-disubstituted-thiodiacetic acid. The α,α-disubstitutedthiodiacetic acid upon reaction with ammonia or a substituted amine and in either case followed by pyrolysis yields the desired 2,2-disubstituted-3,5-thiamorpholinedione or the desired 2,2,4-trisubstituted-3,5-thiamorpholinedione. Reaction between the thiodiacetic acid and the ammonia or the amine readily occurs upon adding one reactant to the other. It will be understood that, when a substituted amine is used in this last step, the compound will have an alkyl, alkenyl or aralkyl radical attached to the nitrogen atom. If it is desired to have an acyl radical attached to this nitrogen atom, this can be accomplished by heating the 2,2-disubstituted-3,5-thiamorpholinedione with an acyl halide or an acid anhydride.

The end products resulting from the reaction of the mercapto products with chloroacetamide can be separated, if desired, and each converted to the 2,2-disubstituted-3,5-thiamorpholinedione as described above, or the mixture of monoamide and diamide products resulting from this reaction can be pyrolyzed yielding the 2,2-disubstituted-3,5-thiamorpholinedione directly.

The mixture of mercapto compounds obtained as an oil as a result of the hydrolysis of the thiazolidone also can be converted to the 2,2-disubstituted-3,5-thiamorpholinedione by dissolving it in an alkaline solution and treating it with ethyl chloro- or bromoacetate. Acidification with a mineral or an organic acid of this reaction mixture causes to precipitate a mixture consisting of the ethyl esters of the α,α-disubstituted-thiodiacetic acid and its monoamide. These compounds are separated by treatment with an alkaline solution advantageously with sodium or potassium bicarbonate in which the monoamide is insoluble.

The ethyl ester of the α,α-disubstituted-thiodiacetic acid is treated with thionyl chloride and then ammonia to give the monoamide. The combined yield of the ethyl ester of the α,α-disubstituted-thiodiacetic acid monoamide preferably is dissolved in a mixture of hydrochloric and acetic acids and the solution refluxed to give the 2,2-disubstituted-3,5-thiamorpholinedione.

The following examples will describe in greater detail the preparation of the novel compounds of this invention by each of the methods described above. The examples are illustrative of each of these processes and are not intended to be limitative, as variations and modifications can, and indeed must, be made in them in order to adjust the conditions to the particular requirements of the reactants employed. Such modifications, however, would be readily apparent to a chemist working in this art.

PROCESS ACCORDING TO METHOD A

*Example I.—2,2-diethyl-3,5-thiamorpholinedione*

Step a:

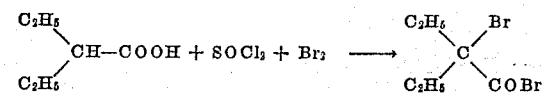

In a round-bottomed flask equipped with a dropping funnel and a condenser connected to an acid gas absorption trap was placed α-ethylbutyric acid (232 g., 2.0 moles). Thionyl chloride (262 g., 2.2 moles) was added dropwise over a period of 1 hour. The mixture was heated on a steam bath during the addition and for 1 hour longer. Then, with continued heating, bromine (320 g., 2.0 moles) was added in small portions as rapidly as it would react. The time required for the addition of bromine was about 5 hours. Distillation of the reaction mixture from a Claisen flask gave 331.5 g. of α-bromo-α-ethylbutyryl bromide, a yellowish oil, B. P. 82–88° C. (14 mm.).

Step b:

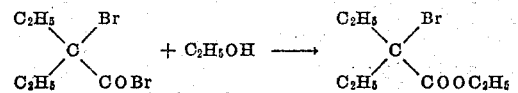

The crude undistilled reaction mixture was entirely satisfactory for use in preparing the ethyl ester by adding ethanol (138 g., 3.0 moles) thereto dropwise over a period of two hours. The mixture was heated on a steam bath during the addition and for 1 hour longer. The reaction mixture was cooled, washed with water and 5% sodium bicarbonate solution, dried over sodium sulfate and distilled, yielding ethyl α-bromo-α-ethylbutyrate, a colorless oil, B. P. 80–82° C. (10 mm.), $n_D^{25}$ 1.4546.

Step c:

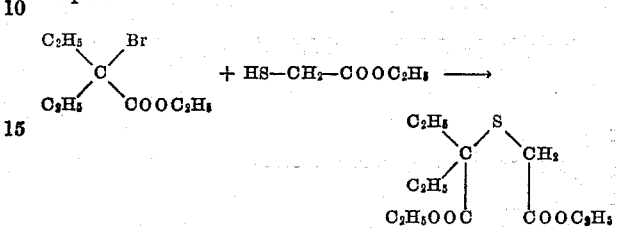

The ethyl α-bromo-α-ethylbutyrate (223 g., 1.0 mole) and ethyl thioglycolate (120 g., 1.0 mole) were added to a cooled solution of sodium (23 g., 1.0 mole) dissolved in 700 cc. of ethanol. The solution was allowed to stand under nitrogen for eight days. The precipitated sodium bromide was removed by filtration, and the ethanol was distilled at reduced pressure. The residual oil was washed with water, dried over anhydrous sodium sulfate and distilled, yielding crude diethyl α,α-diethylthiodiacetate.

Step d:

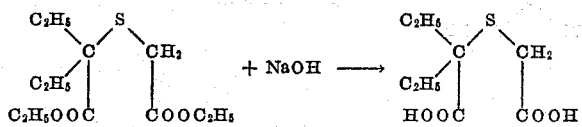

A solution of the above crude product (63 g., 0.24 mole) in 20% sodium hydroxide solution (250 cc.) and methanol (250 cc.) was heated 2½ hours on a steam bath, the methanol being allowed to distill. The solution was cooled and acidified to Congo red with concentrated sulfuric acid. The oil which separated was taken up in ether and dried over sodium sulfate. Evaporation of the ether left the product as a yellow oil. To this oil was added 35 cc. of benzylamine. The mixture was triturated with ether to obtain the benzylamine salt, which was recrystallized twice from isopropyl alcohol, yielding the benzylamine salt having a melting point of 170–172° C. This substance was suspended in 50 cc. of water, and concentrated sulfuric acid was added until the mixture was acidic to Congo red. The crystalline α,α-diethylthiodiacetic acid which separated was recrystallized from cyclohexane to give a pure product melting at 91.5–93.5° C.

Step e:

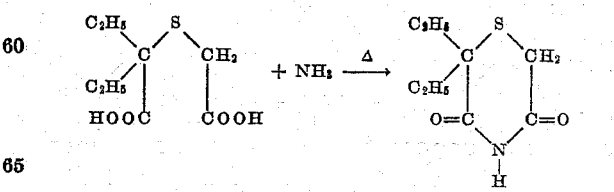

The ammonium salt was prepared by dissolving α,α-diethylthiodiacetic acid (10 g., 0.048 mole) in ether (50 cc.) and adding a 10% solution of ammonia in ethanol (15 cc.). The precipitated salt was collected, dried, and packed into a 25 cc. Claisen flask, fitted with a capillary boiling tube and having a receiver fused to the side arm. The salt was heated by means of a metal bath at 190° C. for 1¼ hours at a pressure of 60 mm. Hg. The pressure was then lowered to 30 mm. and the bath temperature raised to 220° C., whereupon the imide slowly distilled into the receiver. It was obtained as a yellowish, poorly crystalline substance. This crude product was dissolved in a hot mixture of water (40 cc.) and isopropyl alcohol (18 cc.). The solution, which was acidic, was neutralized by the addition of 5% sodium bicarbonate solution (12 cc.). When the solution was chilled, a crystalline product separated which was recrystallized from a mixture of water and isopropyl alcohol (2:1) yielding pure 2,2-diethyl-3,5-thiamorpholinedione, M. P. 85–86° C.

*Example II.—2,2-dimethyl-3,5-thiamorpholinedione*

Step *a*:

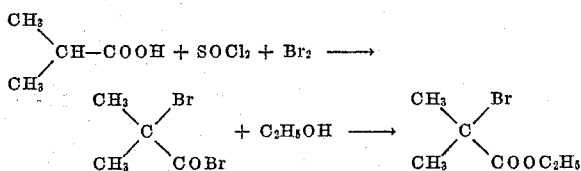

By replacing the α-ethylbutyric acid in step *a*, Example I, by an equimolecular quantity of isobutyric acid and following substantially the same procedure as described in steps *a* and *b*, Example I, there was obtained ethyl α-bromoisobutyrate, B. P. 71–72° C. (27 mm.), $n_D^{25}$ 1.4410.

Step *b*:

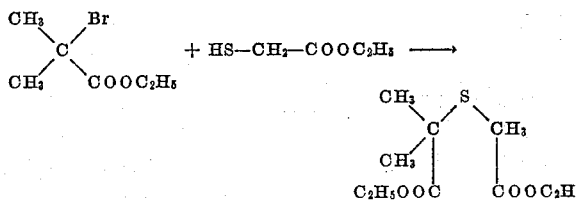

94.5 g. (0.5 mole) of the thus obtained product and ethyl thioglycolate (60 g., 0.5 mole) were added in one portion and with vigorous stirring to a chilled solution of sodium (11.5 g., 0.5 mole) dissolved in ethanol (500 cc.). The solution was allowed to warm to room temperature and stand under nitrogen for four days. The precipitated sodium bromide was then removed by filtration, and the ethanol was distilled at reduced pressure. The residual oil was washed with water, dried over anhydrous sodium sulfate, and distilled to give 101 g. (87%) of diethyl α,α-dimethylthiodiacetate, a water-white oil, B. P. 139° C. (12 mm.).

A portion of this diester was converted to the diacid and then to the desired thiamorpholinedione as described in steps *c* and *d* below. A second portion of the diester was converted to the thiamorpholinedione by first preparing the corresponding diamide which upon pyrolysis formed the imide as described in Example III.

Step *c*:

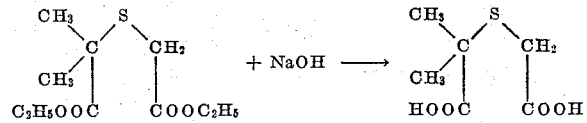

A solution of diethyl α,α-dimethylthiodiacetate (11.7 g., 0.05 mole) obtained in step *b*, in 15% sodium hydroxide solution (75 cc.) and methanol (50 cc.) was heated 3 hours on a steam bath, the methanol being allowed to distill. The solution was cooled and acidified to Congo red with concentrated sulfuric acid to precipitate 5.8 g. (67%) of colorless, crystalline α,α-dimethylthiodiacetic acid, M. P. 105–107° C. One recrystallization of this acid from a cyclohexane-ethyl acetate mixture (3:1) yielded 5.2 g. of pure product, M. P. 106–107° C.

Step *d*:

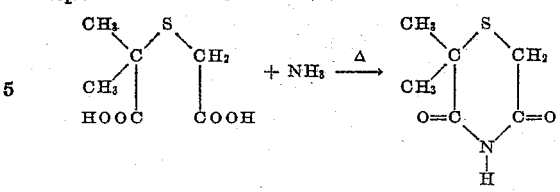

The ammonium salt was prepared from α,α-dimethylthiodiacetic acid (12.5 g., 0.070 mole) by dissolving it in ether (50 cc.) and adding a 10% solution of ammonia in ethanol (15 cc.). The precipitated salt was collected and dried. It was packed into a 25 cc. Claisen flask, fitted with a capillary boiling tube and having a receiver fused to the side arm. The salt was heated by means of a Wood's metal bath at 190° C. for one hour at a pressure of 60 mm. Hg. During this time the salt decomposed with the evolution of gas. The pressure was then lowered to 25 mm. Hg and the bath temperature raised to 230° C., whereupon the 2,2-dimethyl-3,5-thiamorpholinedione slowly distilled into the receiver, where it crystallized. There was obtained 7.4 g. of crude product, M. P. 84–102° C. This product was recrystallized once from ethanol and once from a cyclohexaneethanol mixture (5:1) to give 4.3 g. (40%) of pure product, M. P. 108–109° C.

*Example III.—2,2-dimethyl-3,5-thiamorpholinedione*

Step *a*:

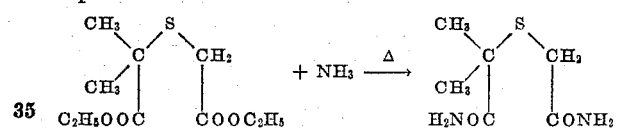

A solution of diethyl α,α-dimethylthiodiacetate (28.0 g., 0.12 mole), obtained as described in step *b*, Example II, in a 12.5% solution of ammonia in ethanol (170 cc.) was placed in a pressure bottle. The bottle was sealed and heated at 65–70° C. for two weeks. The solution was then removed and chilled to 5° C. The precipitate which formed was separated and then recrystallized from a benzene-ethanol mixture (1:5) yielding α,α-dimethylthiodiacetamide, M. P. 139–140° C.

Step *b*:

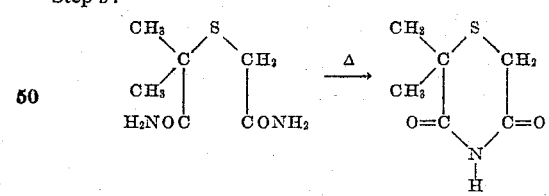

The diamide thus obtained (19.0 g., 0.108 mole) was placed in a 50 cc. Claisen flask, fitted with a capillary boiling tube and having a receiver fused to the side arm, and heated by means of a Wood's metal bath at 200° C. for 30 minutes at a pressure of 60 mm. Hg. The pressure then was lowered to 30 mm. Hg and the bath temperature raised to 240° C. The imide slowly distilled into the receiver where it crystallized. The crude product was recrystallized from a water-ethanol mixture (5:1) yielding pure 2,2-dimethyl-3,5-thiamorpholinedione, M. P. 108–109° C.

*Example IV.—2,2-dipropyl-3,5-thiamorpholinedione*

Step *a*:

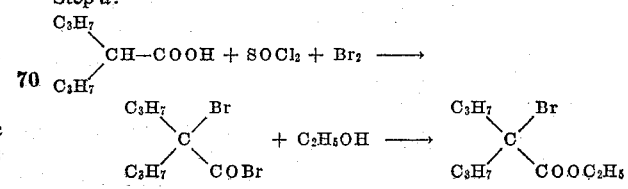

By replacing the α-ethylbutyric acid employed in step a, Example I, by an equimolecular quantity of α-propylvaleric acid and following substantially the same process described in steps a and b of Example I, there was obtained ethyl α-bromo-α-propylvalerate, B. P. 120–122° C. (20 mm.) $n_D^{25}$ 1.4538.

Step b:

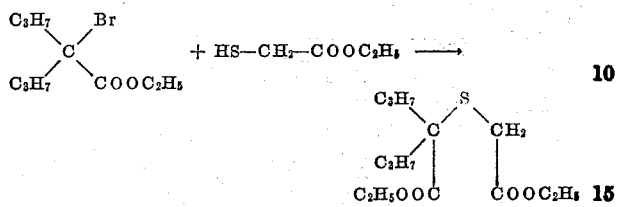

Ethyl α-bromo-α-propylvalerate (25.1 g., 0.10 mole) and ethyl thioglycolate (13.2 g., 0.11 mole) were added at once with good mixing to a cooled solution of sodium (2.5 g., 0.11 mole) dissolved in ethanol (100 cc.). The mixture was allowed to stand under nitrogen for four days. The precipitated sodium bromide was removed by filtration, and ethanol was distilled at reduced pressure. The residual oil was taken up in ether, washed with water and dried over sodium sulfate. The ether was evaporated, and the residue was distilled at reduced pressure. The product, diethyl α,α-dipropylthiodiacetate, a colorless oil, distilled at 165–167° C. (11 mm.).

Step c:

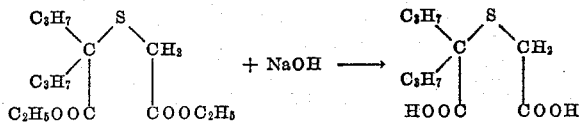

A mixture of the thus obtained product (5.6 g., 0.02 mole) and 15% sodium hydroxide solution (35 cc.) was refluxed for 40 minutes. The resulting clear yellow solution was cooled, and water (50 cc.) was added to redissolve the sodium salt which precipitated. The solution was acidified to Congo red with concentrated hydrochloric acid. The oily acid which separated was taken up in ether. The ether was evaporated, and the semicrystalline residue was dissolved in 20 cc. of 5% sodium bicarbonate solution. When this solution was acidified with concentrated hydrochloric acid, the product separated and quickly crystallized. After recrystallization from a hexane-benzene mixture (10:1) and then from water, there was obtained pure α,α-dipropylthiodiacetic acid, M. P. 96–97° C.

Step d:

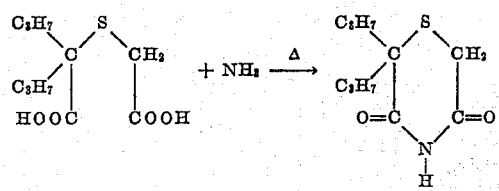

To a solution of α,α-dipropylthiodiacetic acid (16.3 g., 0.07 mole) in ether (60 cc.) was added a 10% solution of ammonia in ethanol (20 cc.). The precipitated ammonium salt was collected, dried, and placed in a 125 cc. Claisen flask fitted with a capillary boiling tube and having a receiver fused to the side arm. The salt was heated by means of a metal bath at 190–200° C. for 40 minutes at a pressure of 80 mm. Hg. The pressure was then lowered to 20 mm., and the bath temperature was raised to 230° C., whereupon the 2,2 - dipropyl - 3,5-thiamorpholinedione slowly distilled into the receiver. The product, a yellow oil, was triturated with 5% sodium bicarbonate solution to give a soft, crystalline product. After three recrystallizations of this material from hexane, there was obtained pure 2,2-dipropyl-3,5-thiamorpholinedione, M. P. 63–64° C.

PROCESS ACCORDING TO METHOD B

Example V.—2,2-dibutyl-3,5-thiamorpholinedione

Step a:

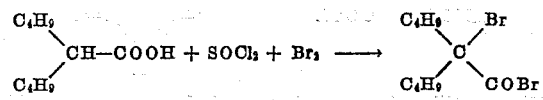

By replacing the α-ethylbutyric acid employed in step a, Example I, with an equimolecular quantity of α-butylcaproic acid and following substantially the same procedure described in step a, Example I, there was obtained α-bromo-α-butylcaproyl bromide, B. P. 129–140° C. (16 mm.).

Step b:

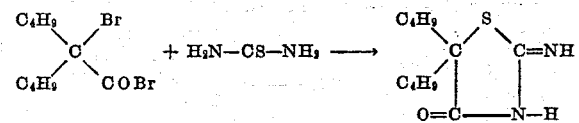

To a refluxing solution of thiourea (125 g., 1.65 mole) in acetic acid (600 cc.) in a 2-liter flask equipped with a condenser and dropping funnel, α-bromo-α-butylcaproyl bromide (173 g., 0.55 mole) was added dropwise during 20 minutes. The mixture was refluxed for an additional 15 minutes, and then the acetic acid was removed by distillation at reduced pressure. To the residue was added water (500 cc.), and the mixture was neutralized by the addition of concentrated ammonium hydroxide solution. The gummy, yellow solid which precipitated was collected on a filter and washed with ether. It was recrystallized from a water-ethanol mixture to give white crystalline 5,5 - dibutyl - 2 - imino - 4 - thiazolidone, M. P. 216–222° C.

Step c:

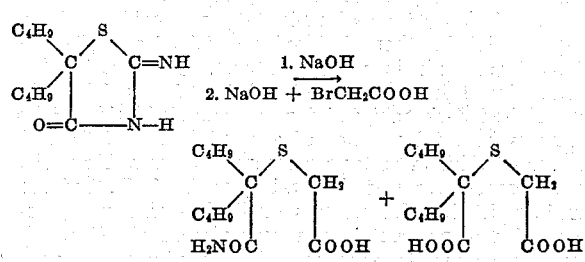

A mixture of the thus obtained 5,5 - dibutyl - 2 - imino-4-thiazolidone (22.8 g., 0.100 mole) and 15% sodium hydroxide solution (120 cc.) was refluxed for 40 hours. The resulting solution was cooled and acidified to Congo red with concentrated hydrochloric acid. The oil which separated was taken up in ether. The ether was evaporated, leaving a colorless oil which was dissolved in 10% sodium hydroxide solution (80 cc.). To this solution was added a solution of bromoacetic acid (13.9 g., 0.100 mole) in 10% sodium hydroxide solution (40 cc.). After 15 minutes, the solution was acidified with concentrated hydrochloric acid. The white gummy substance which separated was taken up in ether and dried over sodium sulfate. The resulting solution was chilled and 8.3 g. of impure crystalline α,α-dibutyl-α-carboxymethylmercaptoacetamide, M. P. 85–105° C., was deposited and separated by filtration. (The filtrate, which contained the diacetic acid, was set aside and subsequently converted to the thiamorpholinedione by the process described in Example VI.) The dried solution was concentrated to a volume of approximately 40 cc. and diluted with 100 cc. of petroleum ether (B. P. 30–60° C.). Two recrystallizations of the impure crystalline material from cyclohexane produced the pure product, M. P. 128–129° C.

Step d:

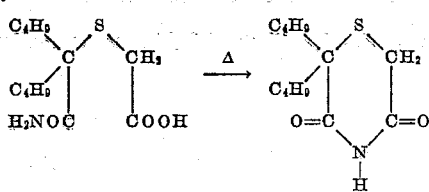

The α-α-dibutyl-α-carboxymethylmercaptoacetamide (6.3 g., 0.024 mole) was placed in a 50 cc. Claisen flask equipped for vacuum distillation. The amide was heated for 40 minutes at 140–160° C. under a pressure of 60 mm. Hg. The imide which had formed was then distilled at oil pump pressure. There was obtained 5.0 g. of very viscous oil. This product was redistilled to give 4.0 g. (68%) of 2,2-dibutyl-3,5-thiamorpholinedione.

Example VI.—2,2-dibutyl-3,5-thiamorpholinedione

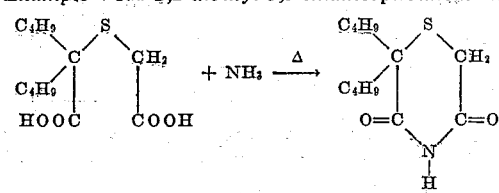

The solvents were completely evaporated from the filtrate from the impure acetamide, obtained in step c, Example V, and the residue was dissolved in petroleum ether (30 cc.). This solution was chilled, and impure α,α-dibutylthiodiacetic acid, M. P. 60–72° C., was precipitated. This substance was dissolved in a hot mixture of concentrated hydrochloric acid (90 cc.) and acetic acid (60 cc.), and the solution was refluxed for 16 hours. The solution was then chilled, and an oil separated which quickly crystallized. There was obtained 8.5 g. α,α-dibutylthiodiacetic acid, M. P. 74–77° C., which was recrystallized from a mixture of cyclohexane and petroleum ether (1:15) to give the pure product, M. P. 76–77° C. To a solution of α,α-dibutylthiodiacetic acid (10.5 g., 0.040 mole) in ether (100 cc.) was added a 10% solution of ammonia in ethanol (6 cc.). The precipitated ammonium salt was collected, dried, and placed in a 50 cc. Claisen flask equipped for vacuum distillation. The salt was heated by means of a metal bath at 180–190° C. for 45 minutes under a pressure of 80 mm. Hg. The bath temperature was then raised to 240° C., and the imide which had formed was distilled at oil pump pressure. There was obtained a very viscous oil. The oil was dissolved in ether (50 cc.). The solution was washed with two 25 cc. portions of saturated sodium bicarbonate solution and was dried over sodium sulfate. The ether was evaporated, and the residue was redistilled, yielding pure 2,2-dibutyl-3,5-thiamorpholinedione, B. P. 159–161° C. (1 mm.), $n_D^{24}$ 1.5126, $d^{24}$ 1.089.

Example VII.—2-ethyl-2-butyl-3,5-thiamorpholinedione

Step a:

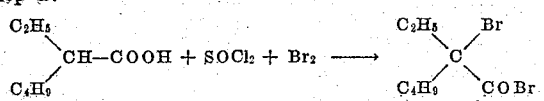

By replacing the α-ethylbutyric acid employed in step a, Example I, with an equimolecular quantity of α-ethylcaproic acid, and following substantially the same procedure described in step a, Example I, there was obtained α-bromo-α-ethylcaproyl bromide, B. P. 106–116° C. (15 mm.).

Step b:

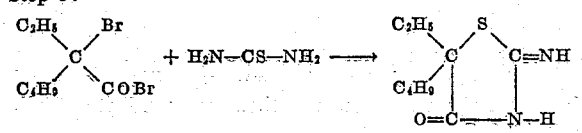

0.55 mole of the thus obtained α-bromo-α-ethylcaproyl bromide was reacted with thiourea (1.65 moles) in the same type of apparatus and by substantially the same process described in step b, Example V, yielding 5-ethyl-5-butyl-2-imino-4-thiazolidone, M. P. 202–203° C.

Step c:

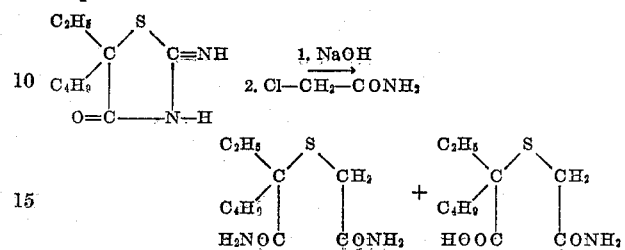

A solution of 5-ethyl-5-butyl-2-imino-4-thiazolidone (48.5 g., 0.242 mole) in 15% sodium hydroxide solution (250 cc.) was refluxed for 48 hours. The solution was cooled and acidified with concentrated sulfuric acid. The oil that separated was taken up in ether. The ether was evaporated, and the colorless residue was dissolved in 10% sodium hydroxide solution (200 cc.). To this solution was added chloroacetamide (22.6 g., 0.242 mole). The chloroacetamide quickly dissolved and the mixture became warm. After 30 minutes, when the sodium nitroprusside test was negative for the presence of RS⁻, the solution was acidified with concentrated sulfuric acid to precipitate a crystalline material weighing 58.5 g., M. P. 125–145° C. This material was finely powdered and stirred with 400 cc. of saturated sodium bicarbonate solution for one hour. The insoluble substance was collected on a filter and the filtrate, containing the monoamide, was set aside for use in Example VIII. The solid material obtained weighed 20.6 g., and represented pure α-ethyl-α-butylthiodiacetamide, M. P. 147–149° C. This product was recrystallized from isopropyl alcohol without a change in its melting point.

Step d:

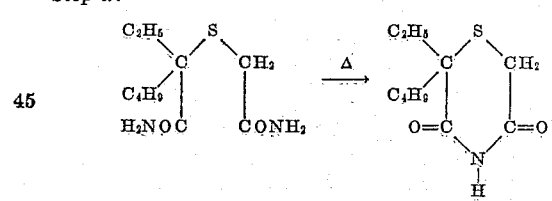

The α-ethyl-α-butylthiodiacetamide (25.0 g., 0.108 mole) was placed in a 125 cc. Claisen flask equipped for vacuum distillation and was heated by means of a metal bath at 160–165° C. for 40–45 minutes under a pressure of 40 mm. Hg. The diamide melted and decomposed vigorously. Then the 2-ethyl-2-butyl-3,5-thiamorpholinedione which had formed was distilled at oil pump pressure. There was obtained a viscous, colorless oil, B. P. 156–160° C. (4 mm.). The product crystallized on standing overnight. Its melting point was 37–39° C. and was unchanged by recrystallization of the product from petroleum ether.

Example VIII.—2-ethyl-2-butyl-3,5-thiamorpholinedione

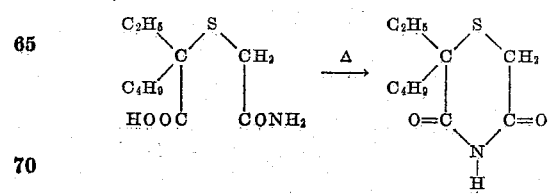

The filtered sodium bicarbonate solution, obtained in step c, Example VII, was acidified with concentrated sulfuric acid to precipitate a crystalline acid which was recrystallized from isopropyl alcohol to give 15.1 g. of the pure α-ethyl-α-butyl-α-carbamylmethylmercaptoacetic acid, M. P. 157–158° C. This monoamide (15.0 g., 0.0645 mole) was placed in a 50 cc. Claisen flask equipped for vacuum distillation and was heated at 200° C. for 40 minutes under a pressure of 40 mm. Hg. The imide, 2-ethyl-2-butyl - 3,5 - thiamorpholinedione, which had formed was then distilled at oil pump pressure. There was obtained 11.9 g. of a yellowish viscous oil, B. P. 160–163° C. (5 mm.). The product crystallized slowly and melted at 35–39° C. The product, recrystallized from petroleum ether (B. P. 30–60° C.), gave 2-ethyl-2-butyl-3,5-thiamorpholinedione, M. P. 37–39° C.

*Example IX.*—*2-isoamyl-2-ethyl-3,5-thiamorpholinedione*

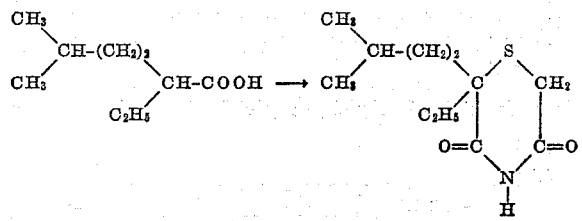

By replacing the α-ethylcaproic acid employed in step *a*, Example VII, with an equimolecular quantity of α-ethyl-isoheptanoic acid, and following substantially the same procedure described in steps *a* to *d*, Example VII, there was obtained 2-isoamyl-2-ethyl-3,5-thiamorpholinedione, B. P. 155–157° C. (5 mm.).

*Example X.*—*2-ethyl-2-isopropyl-3,5-thiamorpholinedione*

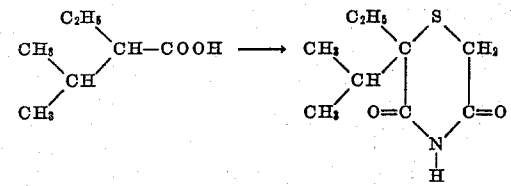

By replacing the α-ethylcaproic acid employed in step *a*, Example VII, with an equimolecular quantity of α-ethyl-isovaleric acid, and following substantially the same procedure described in steps *a* to *d*, Example VII, there was obtained 2-ethyl-2-isopropyl - 3,5-thiamorpholinedione, B. P. 124–128° C. (2–3 mm.), M. P. 96–98° C.

*Example XI.*—*2,2-diethyl-3,5-thiamorpholinedione*

Step *a*:

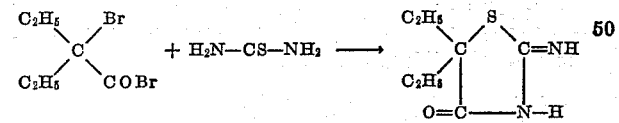

By replacing the α-bromo-α-butylcaproyl bromide employed in step *b* of Example V by an equimolecular quantity of α-bromo-α-ethyl-ethylbutyrylbromide [prepared as described in Example I, step *a*] and following substantially the same procedure described in step *b*, Example V, there was obtained 5,5-diethyl-2-imino-4-thiazolidone, M. P. 219–225° C.

Step *b*:

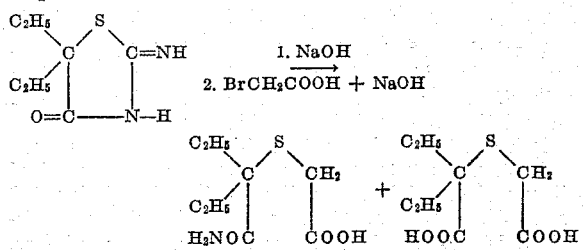

This thiazolidone (51.6 g., 0.30 mole) was dissolved in 15% sodium hydroxide (300 cc.) and then refluxed for 72 hours. The solution was cooled and acidified with concentrated sulfuric acid. The oil which separated was taken up in ether and dried over anhydrous sodium sulfate. The ether was evaporated leaving a colorless residual oil which was dissolved in 10% sodium hydroxide solution (240 cc.). To this was added a solution of bromoacetic acid (41.7 g., 0.30 mole) in 10% sodium hydroxide solution (120 cc.). After 30 minutes, the resulting solution was acidified with concentrated sulfuric acid. The oily acid which separated was taken up in ether and dried over sodium sulfate. The ether was evaporated and the residue was dissolved in a hot mixture of cyclohexane (200 cc.) and isopropyl alcohol (90 cc.). When this solution was chilled, a crystalline substance slowly separated. The precipitated solid material was removed by filtration and the filtrate set aside for use in Example XII. The solid product recovered was recrystallized, from a cyclohexane-isopropyl alcohol mixture (4:1) yielding pure α,α - diethyl - α - carboxymethylmercaptoacetamide, M. P. 121–122° C.

Step *c*:

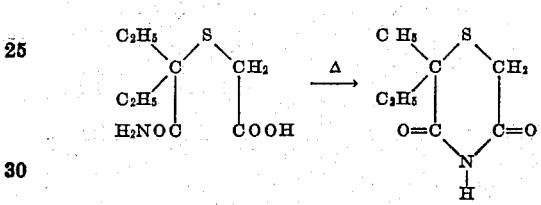

6.0 g. (0.029 mole) of the thus obtained monoamide was placed in a 50 cc. round-bottomed flask and heated by means of a metal bath at 160–170° C. for 45 minutes under a pressure of 60 mm. Hg. The amide melted and decomposed vigorously. The melt was cooled and triturated with saturated sodium bicarbonate solution (25 cc.). The product quickly crystallized. It was recrystallized from a water-isopropyl alcohol mixture (2:1) to give pure 2,2-diethyl-3,5-thiamorpholinedione, M. P. 85–86° C.

*Example XII.*—*2,2-diethyl-3,5-thiamorpholinedione*

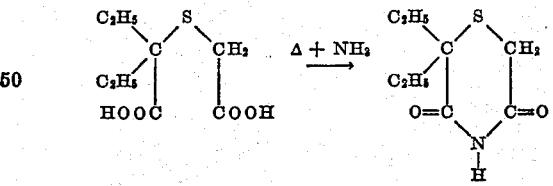

The solvents were completely removed from the filtrate obtained in step *b*, Example XI, and the residue was dissolved in 200 cc. of petroleum ether (B. P. 35–75° C.). The solution was chilled, yielding a crystalline precipitate of impure α,α-diethylthiodiacetic acid which was separated by filtration. The solvent was evaporated from the filtrate leaving an oily residue which slowly crystallized. The resulting crystalline cake was triturated with a small quantity of petroleum ether and sucked dry on a filter, yielding an additional quantity of impure α,α-diethylthiodiacetic acid. The two crops of impure product were combined, dissolved in 200 cc. of refluxing concentrated hydrochloric acid, and the solution was refluxed for 4 hours. On cooling, pure α,α-diethylthiodiacetic acid precipitated, M. P. 92–93° C.

The 2,2-diethyl-3,5-thiamorpholinedione, M. P. 85–86° C., was obtained from the pure α,α-diethylthiodiacetic acid thus obtained by the same process described in step *e*, Example I.

15

*Example XIII.—2,2-dipropyl-3,5-thiamorpholinedione*

Step a:

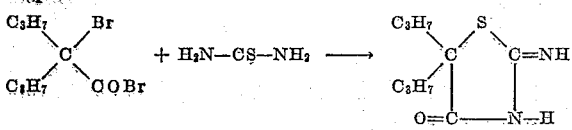

By replacing the α-bromo-α-butylcaproyl bromide employed in step b of Example V by an equimolecular quantity of α-bromo-α-propylvaleryl bromide [prepared as described in step a, Example IV], and following substantially the same procedure described in step b, Example V, there was obtained 5,5-dipropyl-2-imino-4-thiazolidone, M. P. 232–235° C.

Step b:

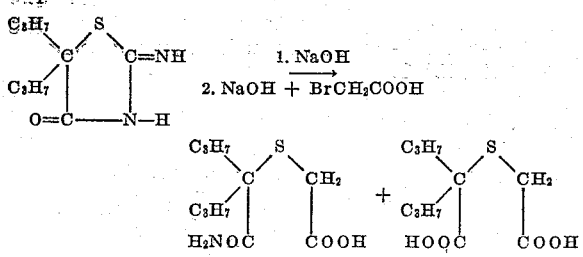

A solution of the thus obtained thiazolidone (34:5 g., 0.173 mole), in 15% sodium hydroxide solution (200 cc.) was refluxed for 46 hours. The solution was cooled and acidified with concentrated sulfuric acid. The oil which separated was taken up in ether and dried over sodium sulfate. The ether was evaporated, and the residual oil was dissolved in 10% sodium hydroxide solution (130 cc.). To this was added a solution of bromoacetic acid (24.0 g., 0.173 mole) in 10% sodium hydroxide solution (70 cc.). After 30 minutes the resulting solution was acidified with concentrated sulfuric acid. The oil which separated was taken up in ether and dried over sodium sulfate. The ether solution was diluted with petroleum ether (100 cc., B. P. 30–60° C.) and chilled. The precipitated material was separated by filtration and after one recrystallization from a mixture of cyclohexane and isopropyl alcohol (3:1) yielded α,α-dipropyl-α-carboxymethylmercaptoacetamide, M. P. 125–126° C. The filtrate obtained above was set aside for use in Example XIV.

Step c:

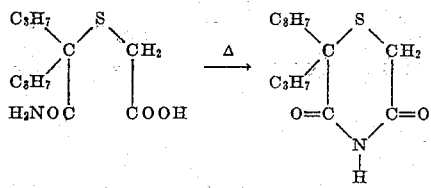

12.2 g. (0.052 mole) of this monoamide was placed in a 100 cc. round-bottomed flask and was heated by means of a metal bath at 170° C. for 35 minutes at a pressure of 60 mm. Hg. The amide melted and decomposed vigorously. The melt was cooled and triturated with 5% sodium bicarbonate solution, whereupon it quickly crystallized. The product was collected by filtration, dried, and recrystallized from hexane to give pure 2,2-dipropyl-3,5-thiamorpholinedione, M. P. 63–64° C.

*Example XIV.—2,2-dipropyl-3,5-thiamorpholinedione*

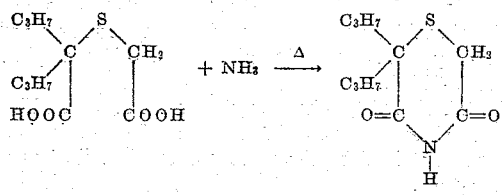

16

The solvents were completely evaporated from the filtrate obtained in step b, Example XIII, and the residue was dissolved in hexane (70 cc.). This solution when chilled deposited impure α,α-dipropylthiodiacetic acid, M. P. 70–81° C. This product was dissolved in a hot mixture of concentrated hydrochloric acid (125 cc.) and acetic acid (65 cc.). The solution was refluxed for 36 hours. On cooling, a precipitate was obtained which was separated by filtration and upon recrystallization from hot water (300 cc.) yielded pure α,α-dipropylthiodiacetic acid, M. P. 96–97° C.

The thus obtained pure α,α-dipropylthiodiacetic acid was reacted with a 10% solution of ammonia in ethanol and pyrolyzed by the same procedure described in step d, Example IV, yielding 2,2-dipropyl-3,5-thiamorpholinedione which, after recrystallization from hexane, melted at 63–64° C.

*Example XV.—2-ethyl-2-phenyl-3,5-thiamorpholinedione*

Step a:

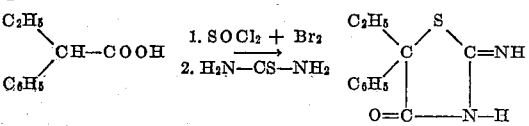

In a one-liter round-bottomed flask equipped with a dropping funnel and a condenser connected to an acid gas absorption trap was placed α-phenyl-butyric acid (170 g., 1.04 moles). Thionyl chloride (137 g., 1.15 moles) was added dropwise over a period of 1 hour. The mixture was heated on a steam bath during the addition. Then, with continued heating, bromine (166 g., 1.04 moles) was added in small portions as rapidly as it would react. The time required for the addition of the bromine was 6 hours. Nitrogen was then bubbled through the mixture for a few minutes to remove dissolved hydrogen chloride and any excess bromine. The product was added dropwise during 20 minutes to a refluxing solution of thiourea (228 g., 3.0 moles) in acetic acid (950 cc.) in a two-liter round-bottomed flask equipped with a dropping funnel and condenser. The mixture was refluxed for an additional 15 minutes, and then the acetic acid was removed by distillation at reduced pressure. To the oily residue was added water (500 cc.). The insoluble oil was removed by extraction with ether. The aqueous solution was made neutral by the addition of concentrated ammonium hydroxide solution. The crystalline precipitate was collected on a Buchner funnel and washed with two 50 cc. portions of ether. It was recrystallized from isopropyl alcohol to give 116.5 g. (51%) of 5-ethyl-5-phenyl-2-imino-4-thiazolidone, M. P. 208–210° C.

Step b:

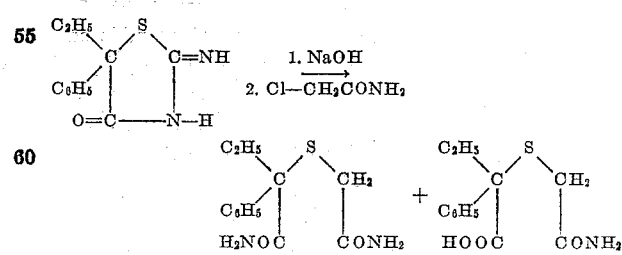

A solution of the thus obtained 5-ethyl-5-phenyl-2-imino-4-thiazolidone (8.0 g., 0.0365 mole) in 5% sodium hydroxide solution (120 cc.) was refluxed for 92 hours. The solution was cooled and acidified with concentrated sulfuric acid. The oily product which separated was taken up in ether. The ether was evaporated, and the residual oil was dissolved in 5% sodium hydroxide solution (60 cc.). Chloroacetamide (3.4 g., 0.0365 mole) was dissolved in this solution. After 5 minutes, the mixture, from which some crystalline product was beginning to separate, was acidified with concentrated sulfuric acid.

The precipitated material was collected and dried. It was finely ground and stirred with 5% sodium bicarbonate solution (40 cc.). The insoluble substance was collected on a filter. It was recrystallized from a mixture of 40 cc. of methanol and 15 cc. of water to yield pure α-ethyl-α-phenylthiodiacetamide, M. P. 180–181° C.

The sodium bicarbonate solution containing the monoamide was set aside for further treatment, according to the process described in Example XVI.

The α-ethyl-α-phenyl-thiodiacetamide, obtained as described above, was divided into two equal parts. One part was converted by the process described in step *c* to its monoamide and subsequently to the thiamorpholinedione by the process described in the immediately following step *d*. A second part was converted directly to the thiamorpholinedione by pyrolysis by the process described in step *e*.

Step *c*:

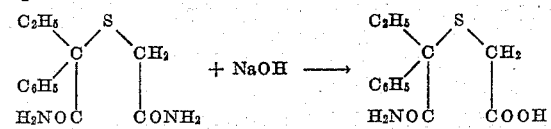

The first portion of the α-ethyl-α-phenylthiodiacetamide (7.7 g., 0.0306 mole) was added to a refluxing 10% sodium hydroxide solution (50 cc.) The refluxing was continued for 5 minutes until a clear solution was obtained. The solution was cooled and acidified with concentrated sulfuric acid to precipitate α-ethyl-α-phenyl-α-carboxymethylmercaptoacetamide, M. P. 142–144° C.

Step *d*:

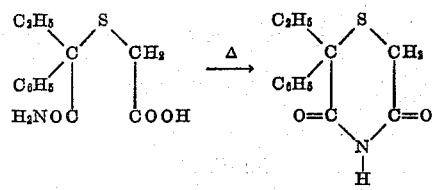

5.8 g. (0.023 mole) of the thus obtained monoamide was heated at 160° C. for 30 minutes under a pressure of 40 mm. Hg. During this time, the substance melted and decomposed vigorously. The melt was cooled and stirred with 5% sodium bicarbonate solution (50 cc.), whereupon it crystallized. The crude product was recrystallized from isopropyl alcohol yielding 2-ethyl-2-phenyl-3,5-thiamorpholinedione, M. P. 111–113° C.

Step *e*:

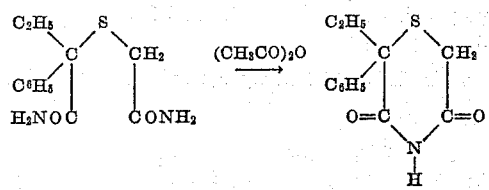

The second portion of the α-ethyl-α-phenylthiodiacetamide (7.7 g., 0.0306 mole), dissolved in acetic anhydride (50 cc.) was refluxed for 10 minutes. The volatile materials were distilled at reduced pressure. The viscous brown residue was stirred with 5% sodium hydroxide solution (120 cc.). The insoluble gum was filtered off. The solution was acidified to precipitate an oil, which slowly crystallized. This material, recrystallized twice from a mixture of water and isopropyl alcohol (2:1), yielded 2-ethyl-2-phenyl-3,5-thiamorpholinedione, M. P. 111–113° C.

Other 2 - alkyl - 2 - aryl - 3,5 - thiamorpholinedione derivatives wherein the aryl group is a halophenyl, alkoxyphenyl or alkylphenyl group can be prepared by replacing the α-phenylbutyric acid employed in Example XV with the appropriate carboxylic acid having the desired substituted-phenyl radical attached to the alpha-carbon atom and following substantially the same procedure described in Example XV.

*Example XVI.—2-ethyl-2-phenyl-3,5-thiamorpholinedione*

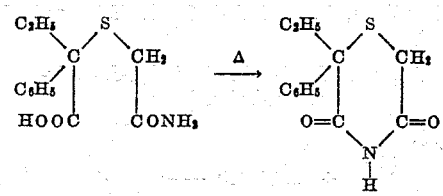

The sodium bicarbonate solution, obtained in step *b*, Example XV, was acidified with concentrated sulfuric acid. The precipitated monoamide was recrystallized twice from a mixture of water and acetic acid (5:1), yielding pure α-ethyl-α-phenyl-α-carbamylmethylmercaptoacetic acid, M. P. 133–134° C.

9.5 grams (0.0375 mole) of the thus obtained product was heated at 180° C. for 45 minutes under a pressure of 25 mm. Hg. The evolution of gas was brisk at first and finally subsided. The melt became dark brown. It was cooled and stirred with 5% sodium bicarbonate solution (50 cc.). A crystalline substance was obtained weighing 5.0 g., M. P. 110–113° C. This product was recrystallized from cyclohexane and then from isopropyl alcohol, yielding 2-ethyl-2-phenyl-3,5-thiamorpholinedione, M P. 111–113° C.

*Example XVII.—2,2 - diethyl - 4 - methyl - 3,5 - thiamorpholinedione*

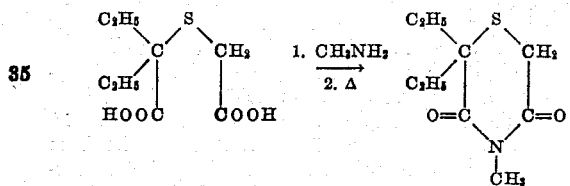

To a solution of α,α-diethylthiodiacetic acid (13.5 g., 0.066 mole), prepared as described in Example I, steps *a* through *d*, in ether (50 cc.) was added a 33% solution of methylamine in ethanol (7 cc.). The precipitated methylammonium salt of α,α-diethylthiodiacetic acid was collected, dried, and placed in a 50 cc. Claisen flask. It was heated at 190° C. for 40 minutes under a pressure of 40 mm. Hg. The bath temperature was then raised to 220° C. and the pressure lowered to 25 mm. The product distilled. There was obtained 8.6 g. of a yellow oil. The oil was shaken with concentrated ammonium hydroxide solution (20 cc.). The insoluble oil was taken up in ether, dried and redistilled to give 4.6 g. (35%) of 2,2-diethyl-4-methyl-3,5-thiamorpholinedione, a colorless, mobile oil, B. P. 148–149° C. (16 mm.), $n_D^{24}$ 1.5184.

*Example XVIII.—2,2,4-trimethyl-3,5-thiamorpholinedione*

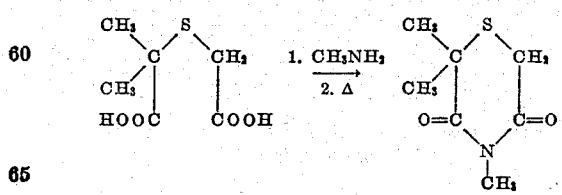

To a solution of α,α-dimethylthiodiacetic acid (0.066 mole), prepared as described in Example II, steps *a* through *c*, in ether (50 cc.) was added a 33% solution of methylamine in ethanol (7 cc.). The precipitated methylammonium salt of α,α-dimethylthiodiacetic acid was collected, dried, and placed in a 50 cc. Claisen flask. It was heated at about 190° C. for about 40 minutes under a pressure of 40 mm. Hg. The bath temperature was then raised to about 220° C. and the pressure lowered to about 25 mm. The product distilled as an oil which was shaken with concentrated ammonium hydroxide solution (20 cc.). The insoluble oil was taken up in ether, dried and redistilled, yielding 2, 2,4-trimethyl-3,5-thiamorpholinedione, B. P. 145–146° C. (34 mm.), M. P. 50–51° C.

*Example XIX.—2,2,4-triethyl-3,5-thiamorpholinedione*

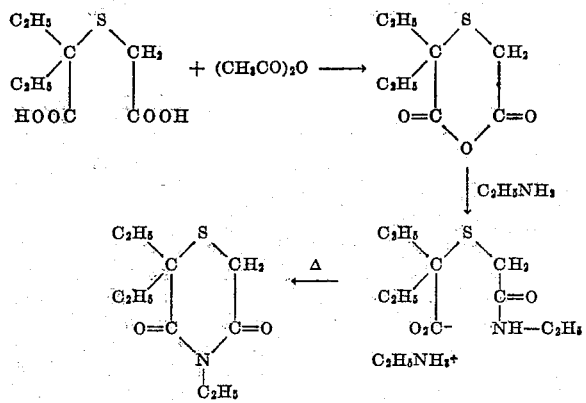

A solution of α,α-diethylthiodiacetic acid (30.9 g., 0.15 mole), prepared as described in Example I, steps *a* through *d*, in acetic anhydride (100 cc.) was refluxed for 2 hours, and then distilled to give 24.5 g. of α,α-diethylthiodiacetic anhydride, B. P. 149–151° C. (15 mm.). The anhydride thus obtained was dissolved in ether (150 cc.) and a solution of ethylamine (20 cc.) in ether (100 cc.) was added slowly with ice-bath cooling. The precipitated ethylammonium salt of α,α-diethyl-α-(N-ethylcarbamylmethylmercapto)acetic acid was placed in a 125 cc. Claisen flask and heated at 180–200° C. for 30 minutes under a pressure of 40 mm. Hg. The bath temperature was then raised to 250° C. and the pressure lowered to 16 mm. The product distilled. There was obtained 14.4 g. of an orange oil. The oil was shaken with 50 cc. of concentrated ammonium hydroxide. The insoluble fraction was taken up in ether and redistilled to give 8.8 g. (32%) of 2,2,4-triethyl-3,5-thiamorpholinedione, B. P. 146–148° C. (15 mm.), $n_D^{25}$ 1.5082.

*Example XX.—2,2-diethyl-4-allyl-3,5-thiamorpholinedione*

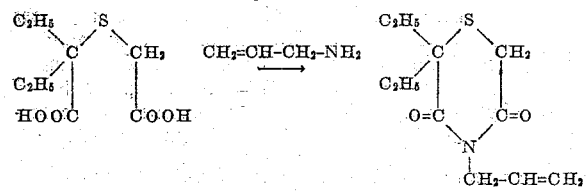

By replacing the ethylamine employed in Example XIX with an equivalent quantity of allylamine, and following substantially the same procedure described in Example XIX, there was obtained 2,2-diethyl-4-allyl-3,5-thiamorpholinedione, B. P. 160–161° C. (16 mm.).

*Example XXI.—2,2-diethyl-4-benzyl-3,5-thiamorpholinedione*

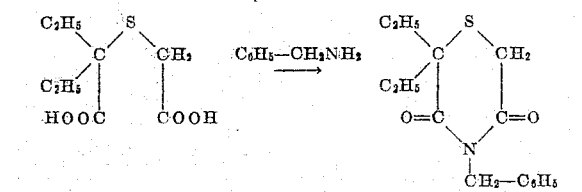

By replacing the ethylamine employed in Example XIX with an equivalent quantity of benzylamine, and following substantially the same procedure described in Example XIX, there was obtained 2,2-diethyl-4-benzyl-3,5-thiamorpholinedione, B. P. 173° C. (3 mm.).

*Example XXII.—2,2-diethyl-4-cinnamyl-3,5-thiamorpholinedione*

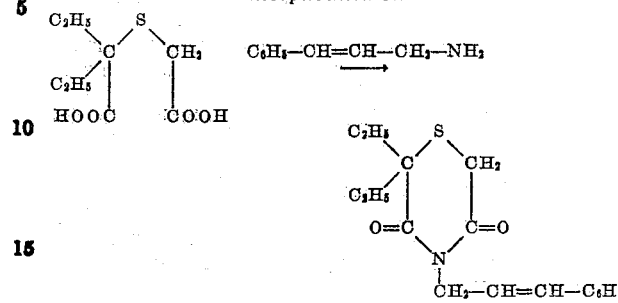

By replacing the ethylamine employed in Example XIX with an equivalent quantity of cinnamylamine, and following substantially the same procedure described in Example XIX, there was obtained 2,2-diethyl-4-cinnamyl-3,5-thiamorpholinedione.

*Example XXIII.—2,2-diethyl-4-acetyl-3,5-thiamorpholinedione*

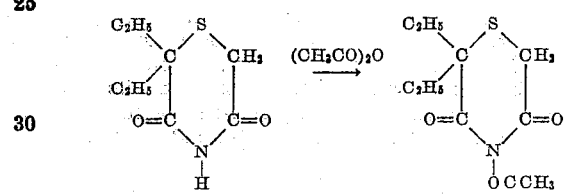

A solution of 2,2-diethyl-3,5-thiamorpholinedione in an excess of acetic anhydride was heated under reflux conditions for 4 days yielding 2,2-diethyl-4-acetyl-3,5-thiamorpholinedione.

*Example XXIV.—2,2-diethyl-4-benzoyl-3,5-thiamorpholinedione*

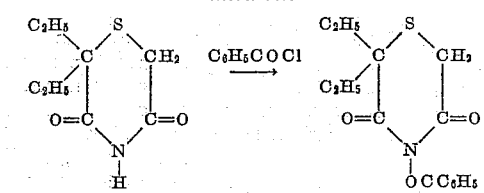

A solution of 2,2-diethyl-3,5-thiamorpholinedione and an excess of benzoyl chloride in pyridine was refluxed for 4 days yielding 2,2-diethyl-4-benzoyl-3,5-thiamorpholinedione.

*Example XXV.—2,2-diethyl-3,5-thiamorpholinedione*

Step *a*:

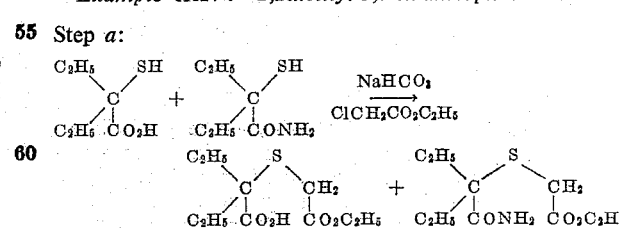

The mixture of mercapto compounds resulting from the hydrolysis of 34.4 g. (0.2 mole) of 5,5-diethyl-2-imino-4-thiazolidone as described in Example XI, step *a*, was dissolved in 400 cc. of saturated sodium bicarbonate solution. Ethyl chloroacetate (22.0 g., 0.18 mole) was added, and the mixture shaken for 30 minutes until homogeneous. The solution was acidified to precipitate an oily mixture of the products. The oil was taken up in ether. The ether solution was extracted with 300 cc. of saturated bicarbonate solution. When the extract was acidified α,α-diethyl-α-carbethoxymethylmercaptoacetic acid precipitated as an oil. Evaporation of the ether solution left the α,α-diethyl-α-carbethoxymethylmercaptoacetamide as a viscous oil.

Step *b*:

α,α-diethyl-α-carbethoxymethylmercaptoacetic acid (23.4 g., 0.1 mole) was dissolved in 30 cc. of thionyl chloride and the solution was refluxed for 45 minutes. Excess thionyl chloride was distilled in vacuo. The oily residue was poured into 50 cc. of ice-cold concentrated ammonium hydroxide solution. The resulting oily product was taken up in ether and dried over sodium sulfate. After evaporation of the ether there was obtained 17.8 g. (76%) of α,α-diethyl-α-carbethoxymethylmercaptoacetamide, a brown viscous oil.

Step *c*:

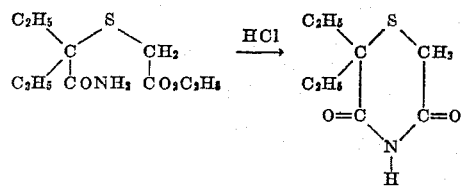

α,α-Diethyl-α-carbethoxymethylmercaptoacetamide (17.8 g., 0.76 mole) was dissolved in 40 cc. of concentrated hydrochloric acid and the solution was heated at 100° C. for 30 minutes. The solution was chilled to precipitate the crystalline product which was recrystallized from an isopropyl alcohol-water mixture to give 7.7 g. (55%) pure 2,2-diethyl-3,5-thiamorpholinedione, M. P. 85–86° C.

The symbol, Δ, used in some of the reaction formulae above indicates that the reaction takes place with heating.

The term oil pump pressure used in the foregoing examples indicates pressures in the range of from about 1 to 5 millimeters.

While the invention has been illustrated by particular 2,2-disubstituted-3,5-thiamorpholinedione and 2,2,4-trisubstituted-3,5-thiamorpholinedione compounds, and particular methods for the preparation of these compounds, the invention embraces the chemical equivalents of the specifically identified compounds, as well as modifications of the methods described for their synthesis.

What is claimed is:

1. A 2,2-disubstituted-3,5-thiamorpholinedione having the structural formula

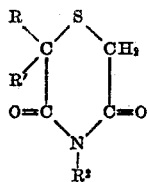

wherein R is a lower alkyl radical; R' is selected from the class consisting of lower alkyl and mono-nuclear aryl radicals; R² is selected from the class consisting of hydrogen and lower alkyl, lower alkenyl, mono-nuclear aryl-lower alkyl, mono-nuclear aryl-lower alkenyl, lower alkanoyl and benzoyl radicals.

2. A 2,2-disubstituted-3,5-thiamorpholinedione having the structural formula

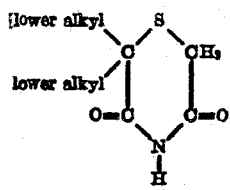

3. A 2,2-disubstituted-3,5-thiamorpholinedione having the structural formula

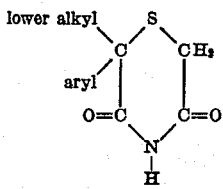

wherein aryl is a mono-nuclear aryl radical.

4. 2-ethyl-2-phenyl-3,5-thiamorpholinedione.
5. 2-ethyl-2-butyl-3,5-thiamorpholinedione.
6. 2,2-diethyl-3,5-thiamorpholinedione.
7. A 2,2,4-trisubstituted-3,5-thiamorpholinedione having the structural formula

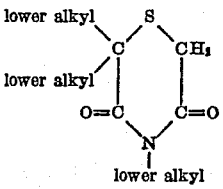

8. A 2,2,4-trisubstituted-3,5-thiamorpholinedione having the structural formula

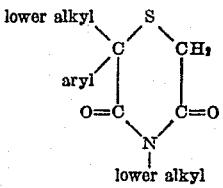

wherein aryl is a mono-nuclear aryl radical.

9. 2,2-diethyl-4-methyl-3,5-thiamorpholinedione.

10. In the process for preparing a 2-R-2-R'-3,5-thiamorpholinedione wherein R is a lower alkyl radical and R' is selected from the group consisting of lower alkyl and mono-nuclear aryl radicals, the steps comprising treating a mixture of α-R-α-R'-α-mercaptoacetic acid and α-R-α-R'-mercaptoacetamide with a haloacetamide and then pyrolyzing the reaction product to form the corresponding 2-R-2-R'-3,5-thiamorpholinedione.

11. A process as claimed in claim 10, wherein the mixture of α-R-α-R'-α-mercaptoacetic acid and α-R-α-R'-α-mercaptoacetamide is obtained by hydrolyzing a 5-R-5-R'-2-imino-thiazolidone in the presence of an alkaline material selected from the group consisting of dilute sodium hydroxide and dilute potassium hydroxide and under refluxing conditions.

References Cited in the file of this patent

UNITED STATES PATENTS

| | | |
|---|---|---|
| 2,545,283 | Johnson | Mar. 13, 1951 |
| 2,585,064 | Wheeler et al. | Feb. 12, 1952 |

OTHER REFERENCES

Rasanen et al.: "J. Am. Pharm. Assoc." (1949), vol. 38, pp. 599–603, (also in "Chem. Abst." (1950), vol. 44, p. 2992).

Barkenbus et al.: "J. Am. Chem. Soc." (1948), vol. 70, pp. 684–5, (also in "Chem. Abst." (1948), vol. 42, p. 3413).